(12) United States Patent
Steinich et al.

(10) Patent No.: US 9,134,123 B2
(45) Date of Patent: Sep. 15, 2015

(54) TENSION ELEMENT POSITION SENSOR (71) Applicant: ASM Automation Sensorik Messtechnik GmbH, Moosinning (DE)

(72) Inventors: Klaus Manfred Steinich, Zorneding (DE); Gunnar Kamp, Erding (DE); Peter Wirth, Eching (DE)

(73) Assignee: ASM Automation Sensorik Messtechnik GmbH, Moosinning (DE)

( * ) Notice: Subject to any disclaimer, the term of this patent is extended or adjusted under 35 U.S.C. 154(b) by 317 days.

(21) Appl. No.: 13/718,910

(22) Filed: Dec. 18, 2012

(65) Prior Publication Data

US 2013/0192079 A1 Aug. 1, 2013

(30) Foreign Application Priority Data

Dec. 23, 2011 (DE) .......................... 10 2011 056 964
Dec. 23, 2011 (DE) ..................... 20 2011 052 453 U (51) Int. Cl.
*G01B 11/26* (2006.01)
*G01B 21/16* (2006.01)
*B60R 16/02* (2006.01)
*G01D 5/14* (2006.01)
*G01D 11/24* (2006.01)

(52) U.S. Cl.
CPC ................ *G01B 21/16* (2013.01); *B60R 16/02* (2013.01); *G01D 5/145* (2013.01); *G01D 11/24* (2013.01); *Y10T 29/49174* (2015.01); *Y10T 29/49948* (2015.01)

(58) Field of Classification Search
CPC ........... G01D 5/34707; G01D 5/34753; G01B 3/002; F16C 29/00
USPC .................................................... 33/706, 756
See application file for complete search history.

(56) References Cited

U.S. PATENT DOCUMENTS

| | | | |
|---|---|---|---|
| 6,154,975 A * | 12/2000 | Steinich | 33/756 |
| 6,381,863 B1 * | 5/2002 | Steinich | 33/756 |
| 6,499,225 B1 * | 12/2002 | Steinich | 33/756 |
| 7,392,597 B2 * | 7/2008 | Steinich | 33/733 |
| 2005/0160614 A1 * | 7/2005 | Steinich | 33/732 |
| 2007/0033823 A1 * | 2/2007 | Steinich | 33/756 |
| 2013/0192079 A1 * | 8/2013 | Steinich et al. | 33/706 |

FOREIGN PATENT DOCUMENTS

| | | |
|---|---|---|
| DE | 10001840 | 7/2000 |
| DE | 19636448 | 9/2001 |
| DE | 19947370 | 10/2001 |
| DE | 102006013100 | 9/2007 |

* cited by examiner

*Primary Examiner* — Yaritza Guadalupe-McCall
(74) *Attorney, Agent, or Firm* — Head, Johnson & Kachigian, P.C.

(57) ABSTRACT

The tension element position sensor includes three housing elements, wherein the two outer housing elements are configured pot shaped with a base towards a center housing component, wherein one element is the spring motor and the other is the rotation angle sensor. Thus the rotation angle sensor includes two Hall sensors, wherein an encoder magnet rotates as a function of the rotation of the winding drum opposite to the faces of the Hall sensors on the face side of one respective gear of two gears meshing with one another. Herein the arrangement of the gears and circuit boards in the receiver of this lateral housing component is of particular importance. Also the spring motor can be completely preassembled and stored in a closed manner.

19 Claims, 9 Drawing Sheets

TENSION ELEMENT POSITION SENSOR

FIELD OF THE INVENTION

The invention relates to a tension element position sensor in which a tension element is wound up or unwound on a winding drum and the rotation thus caused by the winding drum is captured by a rotation angle sensor and converted by a processing unit into a pullout length.

BACKGROUND OF THE INVENTION

Tension element position sensors of this type are known in the marketplace and are being offered in various embodiments:

on the one hand side, they differ through the tension element being used:

For a typically multi-strand thin steel cable configured as a tension element, the cable is wound in one layer adjacent to itself on the winding drum which simplifies processing in that each rotation corresponds to the same pullout length. A disadvantage is the limited loading of the cable and a pullout length that is a function of width and diameter of the cable drum.

When a band is configured as a tension element, the band is wound in a radial plane in plural layers on top of one another so that a rotation corresponds to different pullout lengths depending whether the location is further towards the core or further towards the outside of the spiral.

The functional components of the winding drum on the one hand side and the spiral spring preloading it in windup direction can be different:

Arranged in axial direction behind one another, assembly is simpler and less dangerous, however, it yields a relatively large axial length.

An axially short housing is obtainable when the spiral spring is arranged directly in the interior of the winding drum which, this, however makes assembly more difficult and requires a sufficiently large free space at this location. When the cable is only wound up in one layer, this is typically the case.

For angle sensors, so far mechanical multi-turn potentiometer or optical encoders were used. As an additional alternative now in particular magnetic field direction sensitive angle sensors have been added in which a magnet with its pole axis transversal to the rotation axis of the winding drum is coupled with the winding drum and the rotation of the magnetic field is detected, wherein additional measures have to be performed to provide multi-turn scanning.

DETAILED DESCRIPTION OF THE INVENTION a) Technical Object

Thus it is an object of the invention to provide a tension element position sensor which on the one hand side facilitates using a tension band as a tension element, on the other hand facilitates producing position sensors with very few different housing components and with different pullout lengths and tension elements and redundancy steps and which facilitates quick and in particular risk-free assembly through pre-fabricated sub-assemblies, in that in particular the spring motor is delivered preassembled directly from the spring manufacturer.

b) Solution

This object is achieved through the features of claims 1, 13 and 18. Advantageous embodiments can be derived from the dependent claims.

Through its configuration from three subsequent components, the housing is very flexible with respect to providing different sensors and in particular very assembly-friendly in that it is made from three housing components that are subsequent to one another in axial direction, wherein the center housing component is essentially axially open with a passthrough and includes the winding drum, wherein one of the lateral housing components includes the spiral spring and the other lateral housing component includes the rotation angle sensor.

Alternatively, the housing can also include only two components that follow one after another in an analog manner, namely when the spiral spring is not separately housed in one of the outer housing components, but in an interior of the winding drum and thus one of the two outer housing components can be omitted. The housing component with the winding drum is then also an outer housing component. Subsequently, the embodiment with three housing components is discussed.

The open outer faces of the lateral housing components are closed tight through covers that are applied and attached to the face.

Both lateral housing components can thus be preassembled completely outfitted and preferably already with applied and bolted down face covers as complete units with the center housing component at the end. This is possible among other things in that the two lateral housing components respectively are configured pot-shaped and oriented to the center housing component with the bottom of the pot and only have a small central opening for passing the rotating connection through and have bolt openings at their edges. Preferably, the housing components have rectangular cross-sections and the bolt openings are in the corners.

The lateral housing component with the rotation spring configured as a spring motor can be preassembled and also the lateral housing component with the angle sensor can be completely preassembled as a sensor unit.

For the spring motor this means that the spring is inserted into the housing component and also the face cover is applied and bolted down which closes the lateral housing component in outward direction, however in that nuts with a polygonal outer circumference, i.e. a hexagonal outer circumference, were inserted or integrally molded into face ends of bolt openings axially extending through the lateral housing component in a form locking manner so that the nuts cannot rotate, wherein the nuts are covered by the applied face cover and fixated in a form locking manner.

Thus the spring depending on the desired binding direction can be inserted into the housing component in two different rotation positions and can be connected in a form locking manner with its outer end with the housing component. Accordingly then also the housing component with the winding drum has to be fixated in the respective rotation position.

In the other lateral housing component the sensor is arranged and mounted which reacts to the vector position of the magnetic field.

For this purpose, the bearing pinions of at least two gears that mesh with one another are inserted in respective support boreholes into the base of the lateral housing component wherein the gears protrude into or even through the base of the lateral housing component, so that during subsequent mounting of the three housing components relative to one another at least the support pinion of one gear is rotationally fixed and in contact with the winding drum so that the rotation of the winding drum is captured by the gear which is typically inserted into the center of the housing.

The at least one additional gear does not require any direct contact with the winding drum but is driven through the meshing of the gears.

The permanent magnets which are arranged with a pole axis that extends transversal to the rotation axis or the gears now have to be positioned axially opposite one respective sensor, e.g. a Hall sensor, in particular a multi-Hall sensor.

Thus if possible magnetic field lines shall be obtained that extend in a homogenous manner parallel to one another in a rotation plane relative to the rotation axis which extends through the sensor. In the simplest case, a magnetic dipole suffices that extends transversal to the rotation axis in the rotation plane. Two rod magnets with inverted pole direction that are arranged symmetrical to the rotation axis and offset from one another in radial direction are better for example.

These sensors are arranged on a circuit board which accordingly has to be positioned axially and also radially exactly opposite to the gears.

This is preferably provided in that a pot-shaped receiver is initially placed over the gears wherein the receiver is open at least on one side, preferably on both sides and the receiver is positioned in a form locking manner on the base of the housing component and rotationally fixed therewith and subsequently preferably also bolted down. The electronic circuit board is also inserted into the outward oriented pot-shaped opening also in a form locking manner in axial direction through contact surfaces and also in circumferential direction through positioning pins or similar, wherein the magnetic field orientation sensitive sensors are arranged on the electronic circuit board as well as typically also the processing electronics. The divider wall of the receiver between magnets and sensors is thus non-critical since it is made from a magnetically non-shielding material thus preferably from plastic material like the housing components.

The circuit board, however, thus preferably does not protrude laterally to the inner circumferential surfaces of the receiver, but leaves a circumferential annular gap there between.

Thus a pot-shaped shielding cap made from magnetically shielding material can be inserted into the receiver with the open side of the pot forward and placed over the receiver so that the cap shields the rotation angle sensor on the circuit board magnetically in outward direction in three directions in space.

The shielding cap, however, can also be selected larger and placed over the receiver. Then the annular gap is not necessary.

When the shielding cap is placed over the receiver, the cables that extend from the circuit board are run out through a respective opening in the shielding cap and the cavity between the receiver and the shielding cap is subsequently encased in particular with a curing plastic material through this opening and another opening of the shielding cap so that the circuit board arranged in this cavity is completely enveloped by the plastic material and protected.

Thus the connections through which the receiver component was previously attached at the base of the housing component, in particular bolted down, are sufficiently tight so that no encasement material can penetrate the cavity between the base of the housing component and the receiver, wherein the rotating gears are located in this cavity.

The processing unit can thus be arranged within the housing on the circuit board or it can be arranged outside of the housing. When at least two gears are provided with magnets arranged thereon, the processing unit computes the rotation position of the winding drum within 360 degrees from the difference of the rotation positions of the two gears and also the number of the complete turns covered. It is an advantage of this solution that the entire unwinding of the winding drum can be re-determined at any time even when there is a power outage.

Alternatively, also a single encoder magnet suffices which rotates together with the winding drum when the processing unit always counts the complete revolutions of the encoder magnet and permanently stores it also without energy supply, for example in a FERAM or MRAM.

The sensor unit thus completely preassembled can now be placed onto the one side of the center housing component still without the face cover, wherein the housing component includes the winding drum and the tension element to which the spring motor is applied from the other side.

Through simple insertion of long axial bolts penetrating all housing components from the sensor unit into the inserted nuts of the spring unit, all three housing elements can be bolted together. Eventually, only the face cover has to be bolted onto the sensor unit. If the face cover was already applied previously, the axial bolts extend through the face cover. The plug for running out the signals is thus preferably in a sidewall of the lateral housing component.

Thus, the plug is preferably made from a plug housing and an inner plug with the particular contact pins. The inner plug includes a support template with contact pins radially inserted therein in a form locking manner from the outside, preferably crimped contact pins for the particular strands of the cable running out from the electronics and the support template with the inserted contact pins only has to be inserted from the inside in an axial direction into the plug housing and fixated through a bayonet closure. This substantially facilitates the plug assembly compared to soldering each strand to a pin of a conventionally configured plug.

Optionally, the sensor unit can also be configured redundant in that two associated sensors are respectively provided for counting the entire revolutions and also for determining partial revolutions, wherein the sensors can also only be loaded by one respective gear and thus a magnetic field so that for example four sensors can be provided. Namely the entire revolutions are determined from the difference of the speeds of gears meshing with one another, which have different numbers of teeth, in particular numbers of teeth that only differ by one tooth which is converted through respective computation of the processing unit into the covered entire revolutions and the additional partial revolutions of the central gear.

The permanent magnets on the gears are thus in a pot made from magnetizable material that is open towards the face of the gears or the gears themselves are made from magnetizable material and in particular configured pot-shaped.

This way, a kit can be provided for producing position sensors with receiving units with different sizes, printed circuit boards with identical sizes that are configured differently and gears with different numbers of teeth. In addition to that, the kit can also include housing components which have different lengths e.g. in axial direction and also have different diameters in radial direction.

By the same token, the kit can include a cable and also a band as tension elements.

Accordingly, the winding drums can have different diameters and/or different widths.

By the same token the kit can include completely preassembled spring motors, for example with springs with different lengths, or springs with different winding direction, and/or completely preassembled sensor units.

c) Embodiments

Embodiments according to the invention are subsequently described in an exemplary manner with reference to drawing figures, wherein.

FIGS. 1 through 5 illustrate a tension element position sensor 1 in which a metal band is used for a tension element 3 as apparent from the perspective illustrations of FIGS. 2a through 5.

Figure 1A:
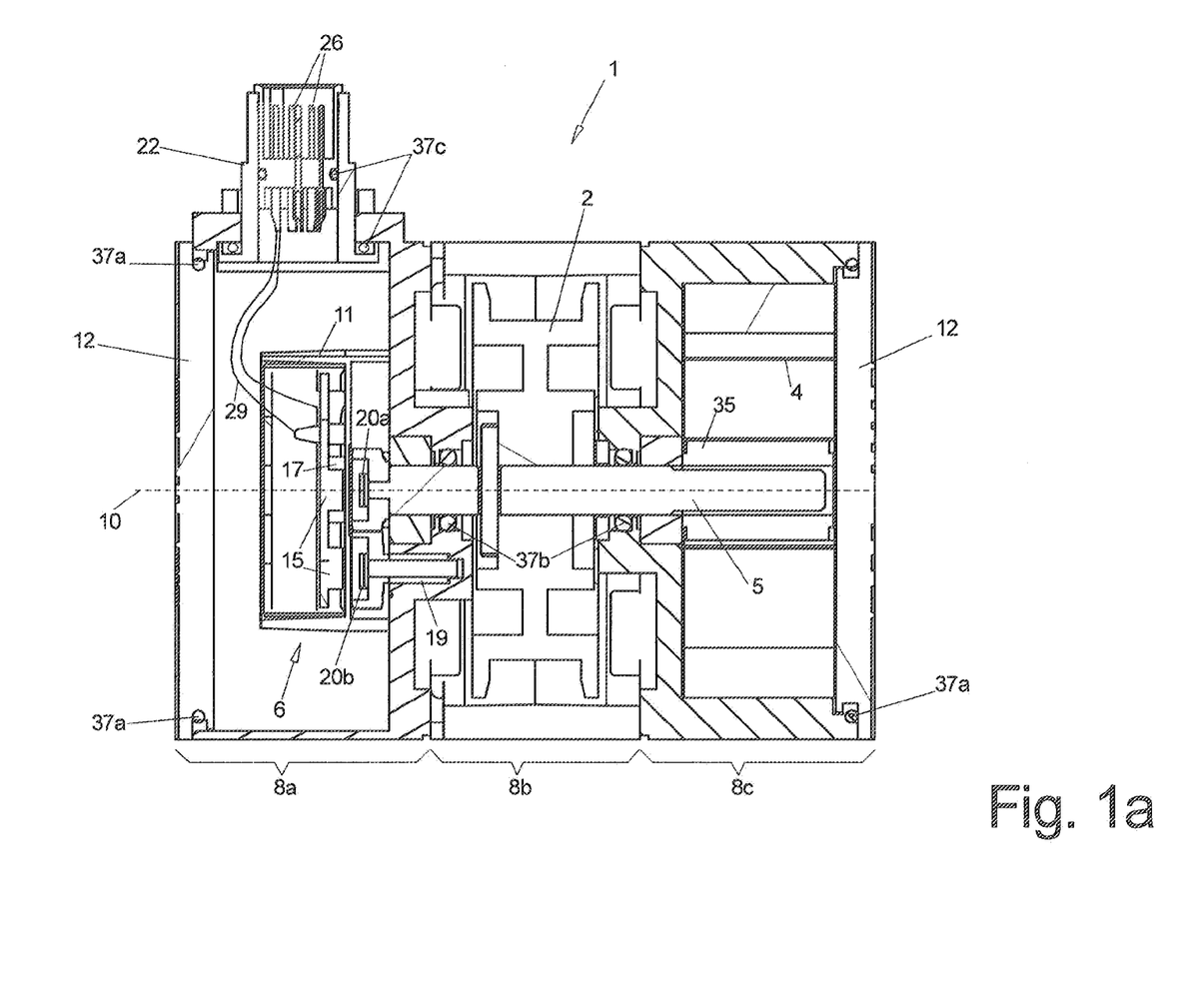
FIG. 1a, b illustrates a completely assembled first embodiment in a longitudinal sectional view and in an axial view.
Figure 1B:
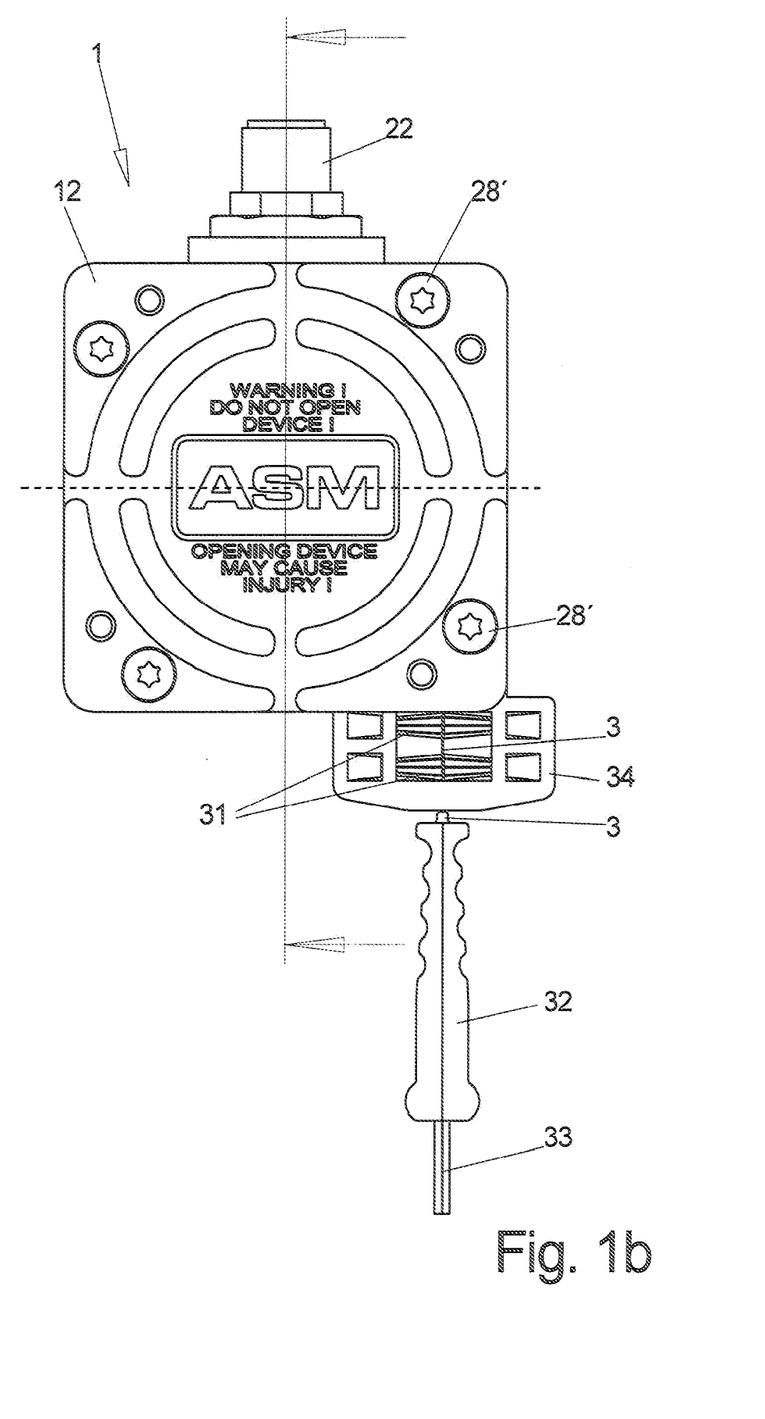

As apparent from the longitudinal sectional view of FIG. 1a, the housing of the position sensor 1 includes three housing components 8a, b, c joining one another in axial direction, wherein the housing components respectively have square cross-sections and wherein the rotation angle sensor 6 is arranged in the first housing component 8a, the winding drum 2 for the band shaped tension element is arranged in the center housing component 8b and the third housing component 8c includes the band spring 4 that is wound as a coil in a plane, wherein the band spring preloads the winding drum 2 in wind up direction.

Thus in FIGS. 2a-c, one respective housing component is illustrated open in partially exploded view, so that its equipment and inner configuration is better apparent as will be described infra.

In the center housing component 8b, on the one hand side, the winding drum 2 for the tension element 3 is attached in the form of a metal band whose one end is attached on the circumferential surface of the winding drum 2 through the illustrated attachment pin.

The band shaped tension element 3 exits the center housing component 8b through one opening in which in one brush housing 34 which is a separate component of the center housing component 8b in pass-through direction, two cleaning brushes 31 engage from each side of the band in order to minimize a penetration of contaminants into the housing component 8b. The brush housing 34 is thus open in axial direction so that contaminants adhering to the brushes 31 can fall out on the side also without taking the brushes 31 out of the brush housing 34 which would only be possible by opening the center housing component 8b.

At the outer free end of the tension band 3, a buffer 32 made from elastic rubber material is molded in the end portion and the tension element has an attachment eyelet at the free end for attaching at the component whose position relative to the position sensor 1 shall be detected.

The winding drum 2 is rotationally fixated on a shaft 5 which axially protrudes beyond the winding drum 2 on both sides and extends into both adjacent lateral housing components 8a, 8c and is also supported in these.

The center housing component 8b is therefore essentially open in axial direction over the entire inner cavity while the two lateral housing components 8a, c are configured pot shaped with their bases oriented towards the center housing component 8b in which only pass-through openings for this shaft 5 are provided.

Figure 2A:
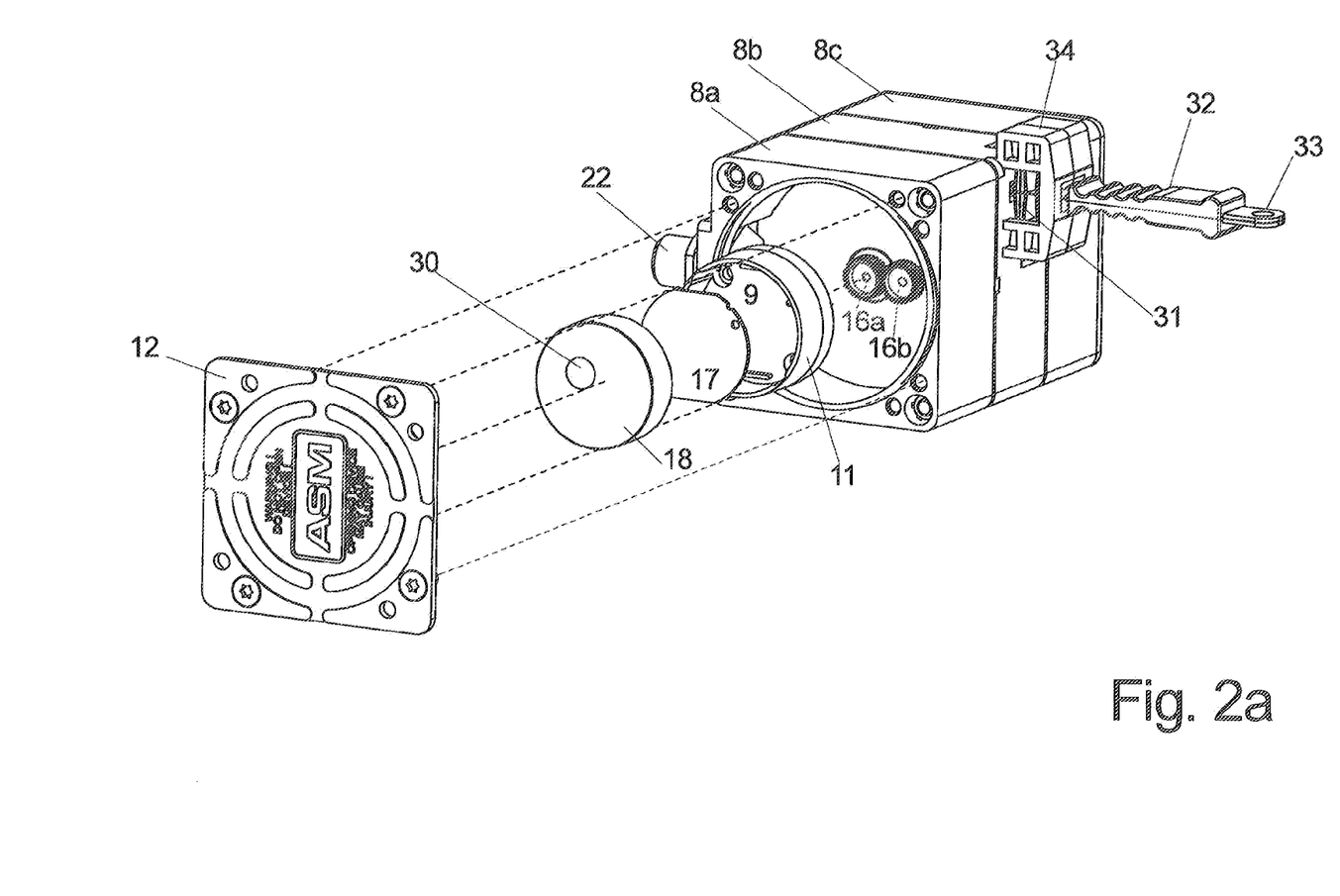
FIG. 2a illustrates the position sensor of FIG. 1 with an opened first housing component.
Figure 2B:
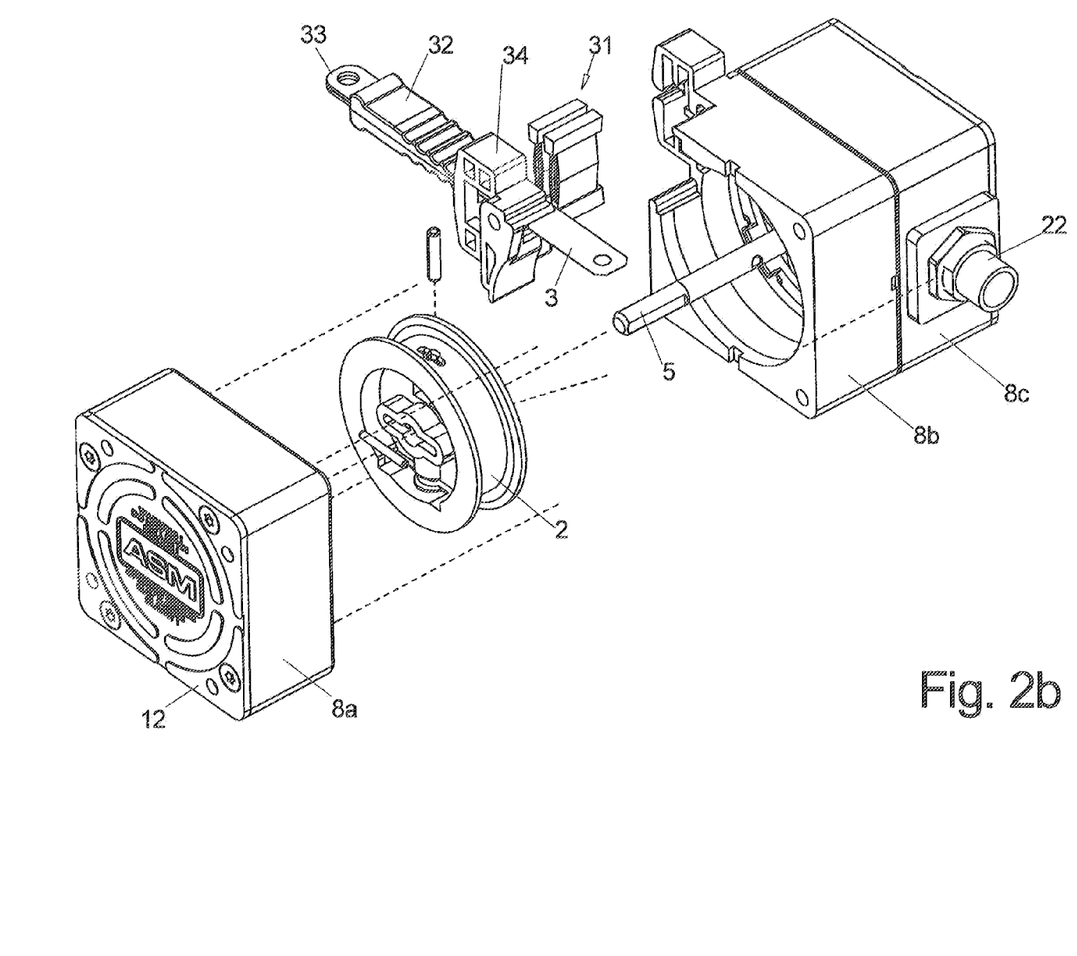
FIG. 2b illustrates the position sensor of FIG. 1 with an opened second housing component.
Figure 2C:
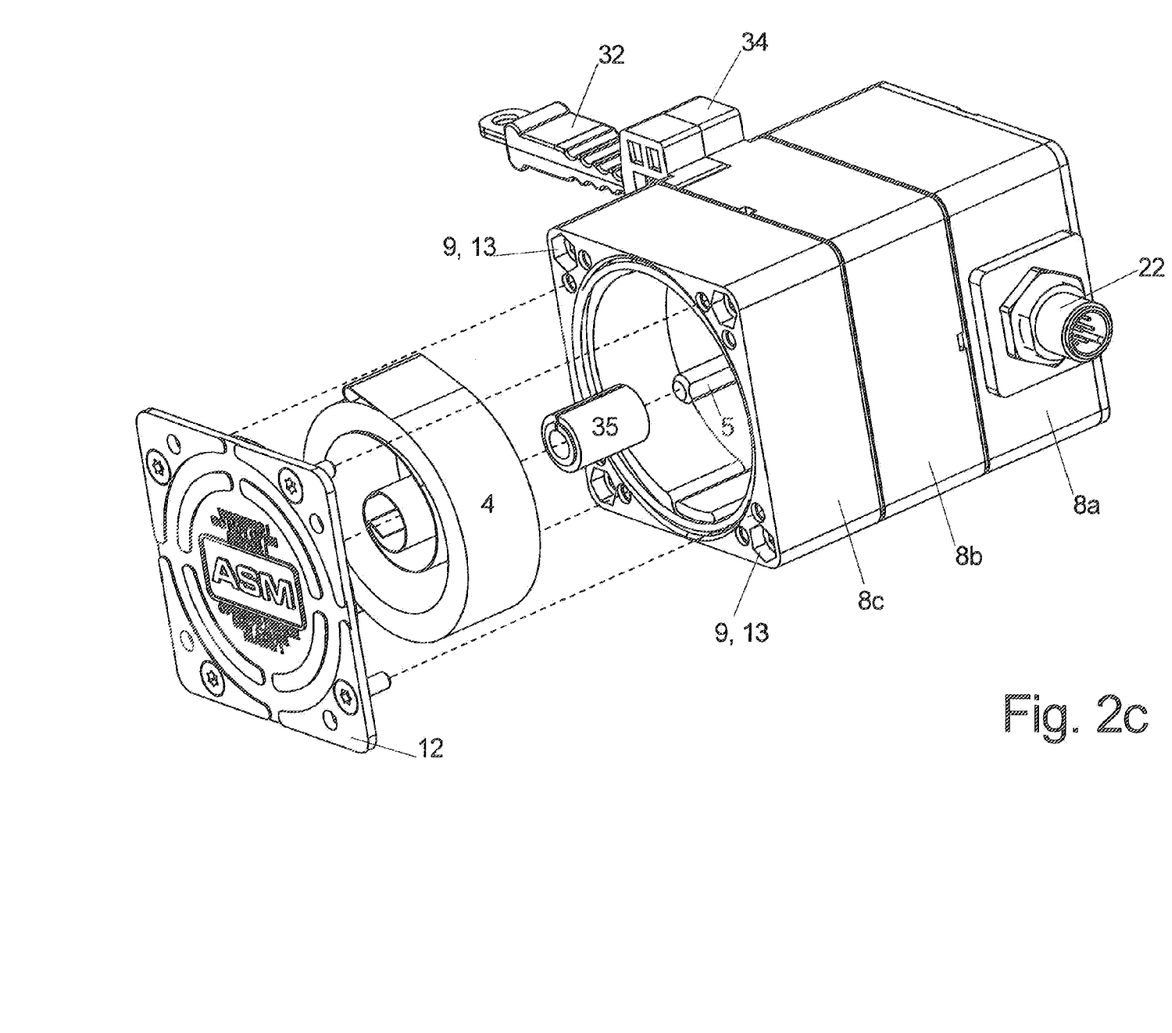
FIG. 2c illustrates the position sensor of FIG. 1 with an opened third housing component.

The spiral band spring 4 is housed in the right lateral housing component 8c that is illustrated in FIG. 1a in which, as illustrated best in FIG. 2c, a central bushing is inserted on the outer circumference of the shaft 5, wherein the central bushing has a slot at a circumferential location, wherein the free inner end of the spiral spring 4 is attached in a form locking manner in the slot.

All three housing components 8a, b, c have continuous bolt channels 9 in their corners that extend over the entire axial length of the housing components, wherein the bolt channels terminate in polygonal recesses 13 in the outer face of the housing component 8c, which includes the spring 4, into which respective insertion nuts 13 can be inserted from the front side of the top shaped housing component 8c.

By subsequently placing the cover 12 on an open face of the housing component 8c that is configured with the spring 4 and by bolting the cover down with the bolts 28' the preassembled housing component 8c also when it is not yet mounted at the center housing component 8b forms a completely preassembled spring motor in which the spring is received completely enclosed so that it can be stored and transported without the risk that the spring 4 can open up since it is disposed in the closed housing component 8c only with limited tension and not yet wound up.

The rotation angle sensor 6 is disposed in the left housing component 8a in FIG. 1a.

The shaft 5 extends into this housing component, wherein the shaft has a non-centric end portion so that the central pot shaped gear 16a which is better apparent in FIG. 2a can be inserted from the open side of this housing component 8a onto the shaft in a form locking manner and can be rotationally fixed with the shaft.

Adjacent thereto and meshing with the first gear 16a, a second gear 16b is inserted with its bearing pinion into a respective dead hole of the base of the housing component 8a, wherein the dead hole was previously configured with a low-friction plastic bushing 19.

The plastic bushing is configured so that the gears 16a, b mesh with one another and are driven through the winding drum 2, wherein the gears 16a, b differ with respect to their number of teeth, preferably only differ by one tooth.

In the pot shaped inner cavity of the two gears 16a, b, a respective encoder magnet 20a, b in the form of a rod magnet with a pole axis transversal to the rotation axis 10 of the shaft 5 is rotationally fixed to the respective gear 16a, b and rotates with this gear.

This rotation of the magnetic field of the two encoder magnets 20a, b is detected through a magnetic field sensitive sensor 15, e.g. a hall sensor which is arranged at the face side opposite to the magnets 20a, b. As best illustrated in FIG. 1a, the sensors 15 are thus arranged on a circuit board 17 on which also the rest of the processing electronics are arranged through which the rotation of the encoder magnets 20a, b determined by the sensors 15 is converted into an extension length of the band shaped tension element 3. Thus it is appreciated that a rotation of the winding drum 2 can correspond to very different pull out lengths, depending how strong the current remaining wind up of the winding drum 2 with the band shaped tension element 3 is.

The processing electronics on the circuit board 17 are connected with the cable 29 through the plug 22 which is arranged in one of the lateral surfaces of the housing component 8a.

In order to facilitate a precisely positioned arrangement after sensors 15 relative to the gears 16a, b in a simple manner during assembly, initially a receiving component 11 which is made from magnetically non-shielding material, typically plastic material, and which is configured pot shaped towards both faces is placed over the already mounted gears 16a, b and positioned in a form locking manner relative to the base of the housing component 8a through contact surfaces and positioning pins and preferably subsequently also fixated through bolting the receiver component 11 relative to the base of the housing component 8a. Subsequently, the circuit board 17 is inserted and positioned in the pot shaped portion of the receiver 11 that is open towards the face which is also performed through respective contact surfaces and positioning pins which are configured in this pot shaped open side of the receiver component 11.

Subsequently, an also pot shaped shielding cap 18 made from magnetically shielding material is placed with its open face forward over the inserted circuit board 17, for which a respective annular gap is provided between the outer circumference of the circuit board 17 and the inner circumference of the pot shaped receiver component 11. Thus the signal conductors configured as cables 29 leading away from the circuit board 17 have to be extended through a respective cable opening 30 in the shielding cap 18. Subsequently, the inner cavity between the shielding cap 18 and the receiver component 11 in which the circuit board 17 is arranged can be completely encased with curing plastic material which encases and protects the entire processing electronics including the sensors 15. For this purpose, the cable opening 30 or a separate encasement opening in the shielding cap 18 is being used.

As soon as the cables 29 are connected with the plug 22, the housing component 8a with the rotation angle sensor 6 is completely preassembled besides the face placement and bolting of the cover 12.

Thus, viewed in an axial direction, the receiver component 11 can have a different contour than the inner cavity of the receiving housing component 8a in order to provide sufficient space in particular at the location where the plug is mounted in the housing component 8a between the receiving component 11 and the housing component 8a for running the cables 29 to the plug. For a circular inner cavity of the housing component 8a, the receiver 11 can for example be flattened on one side or configured elliptical.

Thus it is appreciated that the bolt openings 9 in the cover 12 and the threaded dead holes arranged thereunder in the lateral housing components 8a, c are not arranged precisely in the corners but laterally offset thereto and thus in each corner two such bolt openings 9 with dead hole threads arranged thereunder are arranged for a purpose that will be described infra.

Thus the two outer housing components 8a, c are respectively sealed hermetically tight; the covers 12 are sealed relative to the outer housing components 8a, c through seal rings 37a and the shaft 5 which penetrates the base of the respective outer housing component 8a, c is sealed relative to the housing component through a seal ring 37b.

Furthermore, the plug 22 that is provided in the housing component 8a with the rotation angle sensor thus on the one hand side the outer plug is sealed through a seal ring 37c relative to the housing component and through another seal ring 37c relative to the inner plug included therein.

For final assembly of the position sensor 1 the procedure is as follows:

The housing component 8c is placed as a completely preassembled spring motor on one side onto the center housing component 8b assembled with the winding drum 2 and the shaft 5, for which solely a rotation position needs to be found so that the central bushing 35 can be placed onto the non-centric end portion of the shaft 5.

Subsequently or already previously, the other housing component 8 with the rotation angle sensors 6 is applied, wherein the rotation angle sensor is completely preassembled, in that the central gear 16a is placed in a form locking manner on the non-centric end portion of the shaft 5.

Now the three housing components can be bolted together through bolts 28 which extend over the entire length of all three housing components 8a, b, c in their corner portions. For this purpose, the bolts 28 are inserted together with the rotation angle sensor 6 into the bolt openings in the corners from the open face side of the housing component 8 that is not yet provided with the cover 12, but not yet inserted into the opposite housing component 8c, since this housing component initially has to provide a preloading of the spring 4 in the housing component 8c through a rotation about the rotation axis by a respective number of rotation of the housing component 8c relative to the center housing component 8b and only thereafter the bolts 28 are also moved forward into the housing component 8c and tightened relative to the insertion nuts 14 received therein in a form locking manner.

In a last process step, now only the cover 12 has to be placed and bolted onto the open face side of the housing component 8a with the rotation angle sensor 6.

Figure 4:
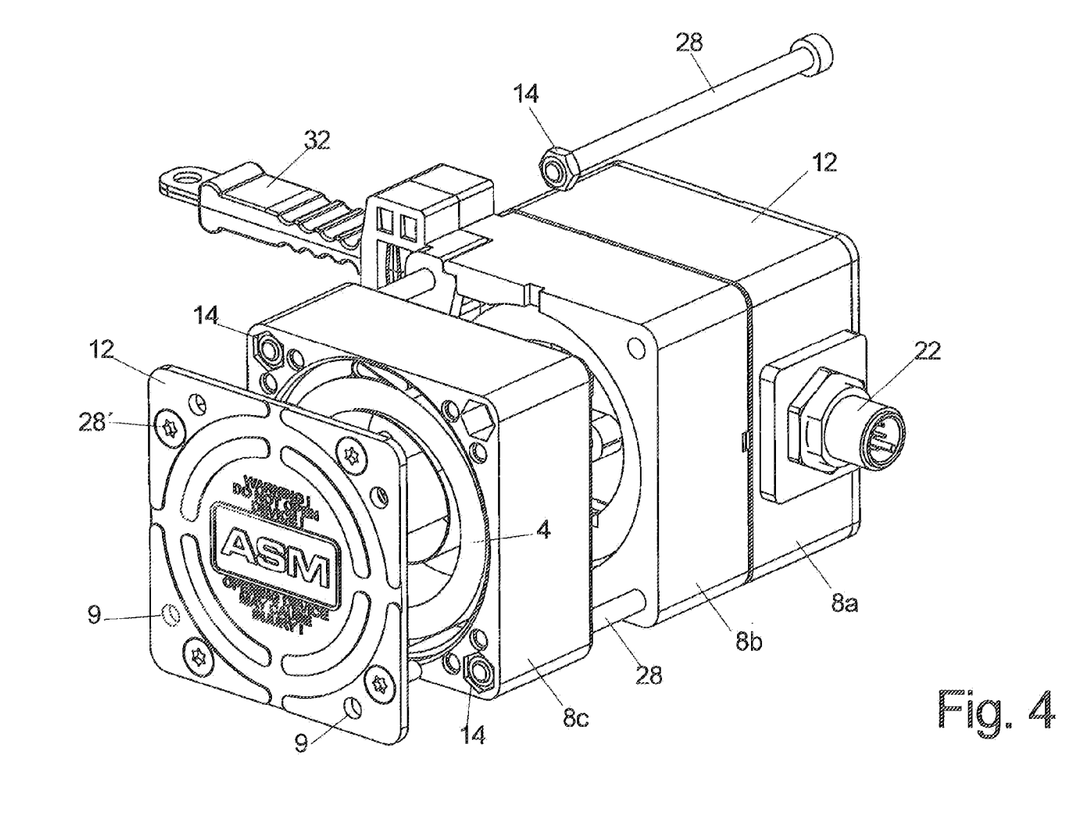
FIG. 4 illustrates the mounted condition of the position sensor of FIG. 1.

As illustrated among other things in FIG. 4, four diagonally slightly offset bolt openings 9 in which no bolt is arranged now remain in each of the face covers 12.

These can be used to bolt down attachment angles 36 at the faces of the completely mounted sensor, wherein the attachment angles are typically made from metal.

Figure 5:
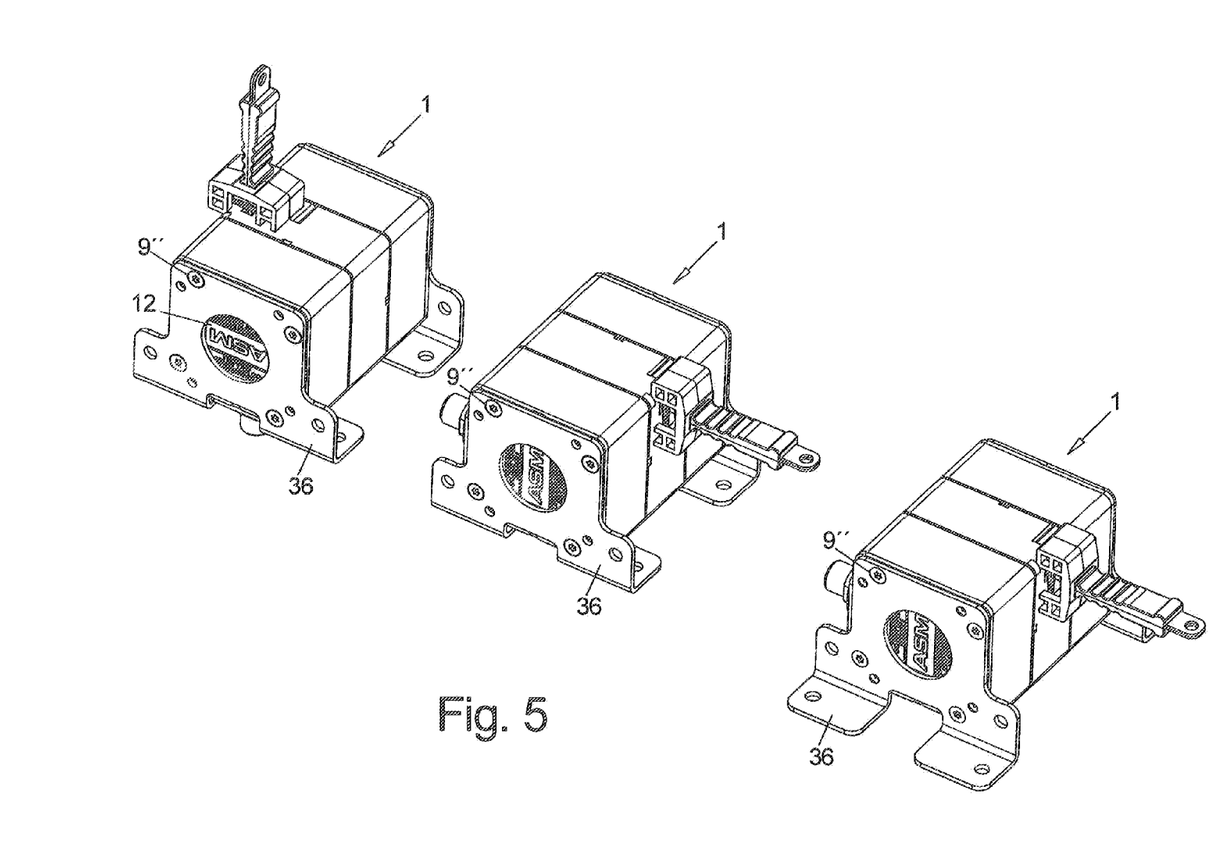
FIG. 5 illustrates the position sensor of FIG. 1 with mounting angles attached thereto.

Thus, the attachment angles can be mounted with the free arm axially protruding from the position sensor 1 or also protruding under the position sensor 1 and due to the square cross-sectional surface of the position sensor 1, the attachment angles 36 can also be bolted at the position sensor in four different rotation positions depending in which direction with reference to the attachment angles 36 the tension element and/or the plugs 32 shall extend.

Figure 3:
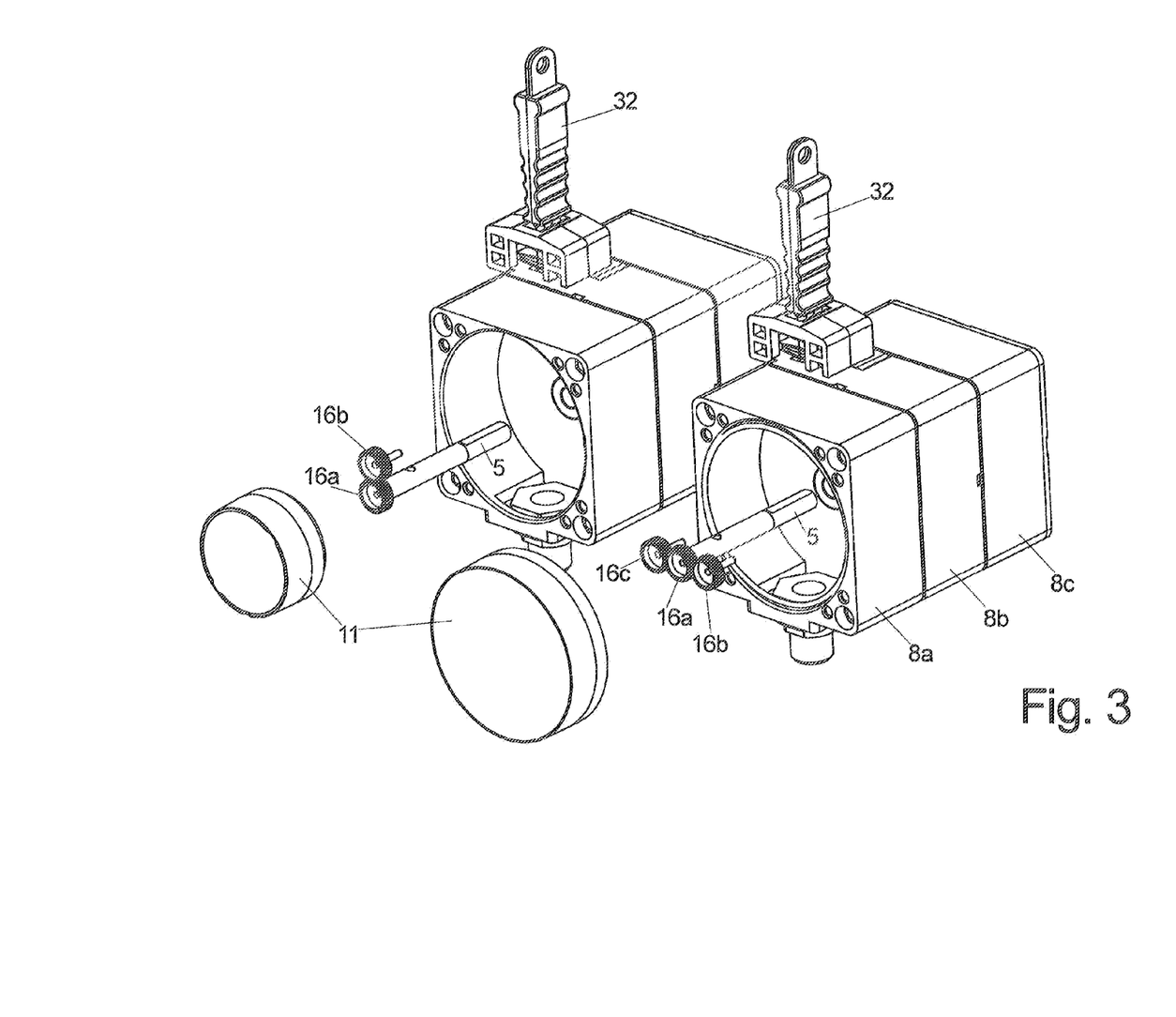
FIG. 3 illustrates position sensors with differently configured first housing components.

FIG. 3 furthermore illustrates how the housing component 8a can be configured with different variants of the rotation angle sensor 6.

On the one hand side, besides the central gear, only one additional gear or also up to four additional gears can be mounted which facilitates for example a redundant configuration of the rotation angle sensor 6 through a respective number of magnetic field sensitive sensors 15.

Accordingly, a larger or a smaller circuit board can be required which is then arranged in a greater or in a smaller receiving element, wherein the same housing component 8a has stop surfaces and positioning pins for the different sizes of the receiving component 11 and certainly also for the maximum number of gears to be inserted and stored, for example 16c.

In another embodiment, the bolt holes 9 of the receiver component 11 for bolting with the base of the housing component 8a are outside of the free inner cavity of the receiver component 11, so that it is possible to outfit the receiver component 11 with the circuit board 17 and the shielding cap 18 and to encase it before the receiver component thus equipped is inserted into the housing component 8a and bolted to it.

Figure 6:
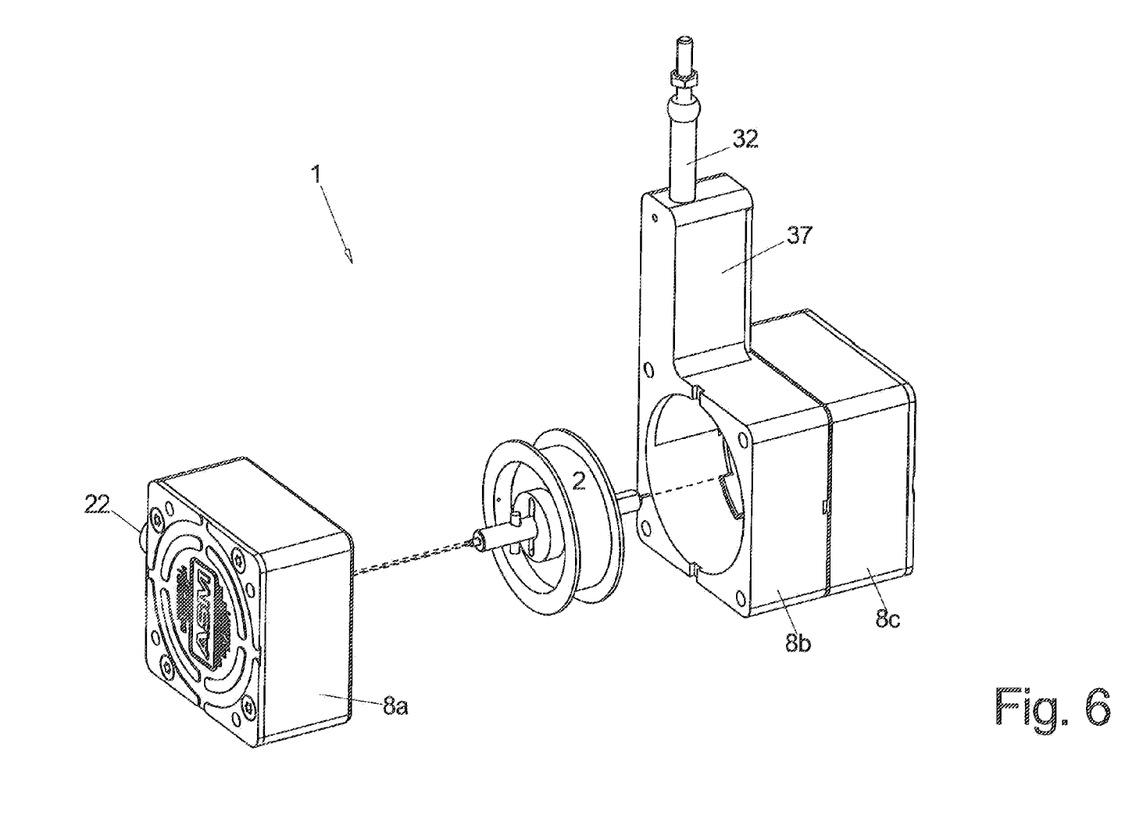
FIG. 6 illustrates a second embodiment of the position sensor according to the invention.

FIG. 6 illustrates a second embodiment of the position sensor 1 in which the center housing component 8b is configured differently, namely for using a thin cable as a tension element which is then wound up on the winding drum 2, preferably not in one radial plane on top of itself, but on its circumferential surface in one layer adjacent to one another.

In order to facilitate this, on the one hand side, the winding drum 2 has an outer circumference that is as large as possible with an extension in axial direction which substantially uses the axial length of the center housing component 8b.

In particular to assure a one-layer wind up of the winding drum without skipping the outlet opening for the tension element from the housing component 8b is moved radially away from the winding drum 2 as far as possible. Therefore the center housing component 8b has a long radial extension which extends in a direction of one of the outsides of the housing component 8b and away from the housing component and at whose free end the outlet opening for the tension element is disposed.

Thus it becomes clear that variable tension element position sensors for various applications can be provided through the kit, for example from different center housing components, different winding drums, different equipment of the housing component for the rotation angle sensor 6, etc., using a small number of different components.

REFERENCE NUMERALS AND DESIGNATIONS 1 tension element position sensor, position sensor
2 winding drum
3 tension element, tension band element
4 spiral band spring, spring
5 shaft
6 rotation angle sensor
8a first housing element
8b center housing element
8c third housing element
9 bolt channels, bolt openings
10 rotation axis
11 receiver component
12 cover, face cover
13 polygonal receiver, insertion nuts
15 magnetic field sensitive sensor
16a pot shaped gear
16b gear
17 circuit board
18 shielding cap
19 plastic bushing
20a,b encoder magnet
22 plug
28' bolts
29 cable
30 cable opening
31 cleaning brushes, brushes
32 buffer, plug
33 attachment eyelet
34 brush housing
35 central socket
36 attachment bracket

The invention claimed is:

1. A tension element position sensor (1), comprising:
a tension element (3) wound up on a winding drum (2), in particular a cable or a band, wherein the winding drum is preloaded through a spring (4) in a wind up direction;
a rotation angle sensor (6) directly or indirectly coupled to the shaft (5) of the winding drum (2) and rotationally fixed thereto, wherein the rotation angle sensor (6) detects complete revolutions and also detects partial revolutions; and
a housing,
wherein the housing includes a first, a second and a third housing component (8a, b, c) with a pass-through in an axial direction arranged in sequence to one another in axial direction of the cable drum,
wherein the second housing component (8b) in which the winding drum (2) is arranged has a substantially open pass-through in axial direction (10); and
wherein each of the first and third housing components (8a, c) join the second component at the face side each are essentially pot shaped, wherein a base of the pot is oriented towards the second housing component (8b) and the pot shaped first and third housing components (8a, c) each have a small central opening in axial direction (10) and bolt openings (9) at corners of the edge; and
wherein the first and third housing component (8a, c) each are closed at their outer face through attached covers (12).

2. The tension element position sensor according to claim 1, wherein processing electronics (7) are provided in particular in the housing, wherein the processing electronics compute signals of the rotation angle sensor (6) into a pullout length of the tension element (3).

3. The tension element position sensor according to claim 2,
wherein a sensor (15) is arranged as an element of the rotation angle sensor (6) in the one outer housing component (8a) which sensor reacts to directional changes of a magnetic field,
wherein at least one encoder magnet (20a) is arranged in an interior of the lateral housing component (8a) and rotationally fixated at the shaft (5) of the winding drum (2), in particular with its pole axis (21) arranged in a rotation plane, so that it generates magnetic field lines that are as homogeneous as possible and arranged in parallel in the rotation plane,
wherein the magnetic field direction sensitive sensor (15) is respectively arranged offset from the magnets with an axial distance, wherein the sensor operates according to the Hall principle and is a multi-Hall sensor and which sensor is arranged on a circuit board (17) which supports the processing electronics (7).

4. The tension element position sensor according to claim 3,
wherein full revolutions of the at least one encoder magnet (20a) are counted by the rotation angle sensor (6), by its processing electronics (7), or
wherein the at least one encoder magnet (20a) is arranged on a face of a gear (16a),
wherein at least one other gear (16b) is arranged adjacent to the in particular central gear (16a) so that it meshes with the central gear and is supported in the lateral housing component (8a), wherein the number of teeth of at least one other gear (16b) differs from the number of teeth of the first gear (16a),
wherein each additional gear (16b) also supports at least one magnet with a pole axis (21) in the rotation plane of the gear (16b) and one respective sensor (15) is arranged opposite thereto,
wherein the processing electronics (7) also determine the complete revolutions performed from the difference of the rotational positions of the gears (16a).

5. The tension element position sensor according to claim 4, wherein low friction plastic bushing (19) are pressed into the base of the housing component (8a) for supporting the gears.

6. The tension element position sensor according to claim 3,
wherein the magnetic field sensitive sensor (15), in particular the circuit board (17) is arranged in a form locking manner in a receiver (11) made from plastic material and is received in a form locking manner in the outer housing component (8a) in that
the receiver component (11) is pot shaped at least on a face side and includes on both face sides positioning pins for positioning with respect to adjacent components, on the one hand side the housing component (8a) and on the other hand side of the circuit board (17), and
includes on both face sides contact surfaces for axial positioning in defined portions contacting the adjacent components; and
wherein an annular gap remains between the circuit board (17) inserted into the receiver component (11) and the inner circumference of the receiver component; and
wherein a magnetically insulating shielding cap (18) with pot shape is placed with its open side forward over the circuit board (17) and extends into the annular gap.

7. The tension element position sensor according to claim 6,
wherein the inner cavity in the receiver component (11) in which the circuit board (17) is arranged, in particular the inner cavity between the receiver (11) and the shielding cap (18) is encased with curing plastic material and envelops the circuit board (17) with the sensor (15).

8. The tension element position sensor according to claim 3, wherein the rotation angle sensor (1b) is redundant in that two identical magnetic field orientation sensitive sensors (15, 15') are provided for counting the complete revolutions and also for determining the partial revolutions.

9. The tension element position sensor according to claim 3, wherein the magnets (20a, b) on the gears (16a, b) are arranged in a pot made from ferro magnetic material that is open towards the face and the gears (16a, b) are pot shaped from magnetizable material.

10. The tension element position sensor according to claim 3, wherein the signal output is performed by the magnetic field orientation sensitive sensor (15) through a plug (22) which includes a plug housing (23) and an inner plug (24) and wherein the inner plug (24) is connected with the plug housing (23) through inserting from the inside and attaching the support template (25) through a bayonet closure in the plug housing (23).

11. The tension element position sensor according to claim 1,
wherein the spring (4) for preloading the winding drum (2) is either arranged in the interior of the winding drum (2) or in the other lateral housing component (8c) and in the latter case form locking openings (13) for inserting insertion nuts (14) are provided in axially continuous bolt channels (9) for bolting together with the other housing components proximal to the open face, wherein the form locking openings (13) are covered by the bolted down face cover (12).

12. A kit for producing a position sensor according to claim 1, wherein the kit includes:
receivers (11) with different sizes and circuit boards (17) attached thereto and shielding caps (18);
circuit boards (17) that have identical sizes but are equipped differently.

13. The kit according to claim 12, including gears (16a, b) with different tooth numbers, that differ only by one tooth from the central gear.

14. The kit according to claim 12 including housing components (8a, b, c) with different lengths in axial direction, differently sized exterior diameters or inner diameters and wherein the kit includes a cable and a band configured as tension elements (3).

15. The kit according to claim 12, wherein the kit includes winding drums (2) with different diameters and/or with different widths.

16. The kit according to claim 12 including preassembled spring motors (27) including a housing component (8c), insertion nuts (14) inserted on the outside with an inserted spring (4) and a cover (12) that is bolted down and covers the insertion nuts (14).

17. A method for assembling a position sensor according to claim 1, which method comprises:
inserting the spring (4) into the lateral housing component (8c) for receiving the spring (4);
inserting the insertion nuts (14) into the provided recesses (13) in a form locking manner;
applying the face cover (12) so that it covers the insertion nuts (14) and so that it is bolted down remote from the insertion nuts (14);
applying the two other housing component (8a, b) that are equipped with the installed components to the housing component (8c) with the spring (4); and
bolting the housing components (8a, b, c) together by threading in the bolts (28) that are inserted from the side that is oriented away from the spring housing and which extend to the insertion nuts (14) in the housing component (8c).

18. The method for assembling a position sensor according to claim 17,
wherein the sensor housing element (8a) is assembled in that
the bearing bushings (19) for the gears (16a, b) are inserted and pressed into the bearing bore holes in the base of the sensor housing element,
wherein the receiver element (11) is placed over the gears (16a, b) and positioned and applied through first positioning pins relative to the base of the housing component (8a),
wherein the receiver element (11) is bolted down to the base of the housing element (8a) by pushing through the bore holes,
wherein the circuit board (17) is placed into the pot shaped top side of the receiver element (11) onto respective positioning pins of the receiver element (11),
insertion of the shielding cap (18) over the circuit board (17) into the receiver element (11) with running cables (29) extending from the circuit board through a respective cable opening (30) in the shielding cap (18),
encasing the inner cavity between the receiver element (11) and the shielding cap (18) through an encasement opening in the shielding cap (18),
connecting the cable ends with the plug (22) in the outer wall of the housing component (8a) and applying the face cover (12) and bolting it together with the housing element (8a).

19. The tension element position sensor according to claim 1,
wherein the housing components (8a, b, c) have identical outer cross-sections.

* * * * *